Aug. 20, 1968 R. G. COLCLASER, JR 3,398,357

CIRCUIT BREAKER TESTING CIRCUITS IN WHICH A NORMALLY CLOSED PAIR OF CONTACTS IN A HIGH CURRENT PATH SHORT CIRCUITS A HIGH RECOVERY VOLTAGE SOURCE AND ANOTHER PAIR OF NORMALLY CLOSED CONTACTS FORMS A LOW IMPEDANCE SHUNT CIRCUIT ACROSS THE HIGH VOLTAGE SOURCE UNTIL BOTH PAIRS OF CONTACTS ARE OPENED

Filed April 24, 1967 3 Sheets-Sheet 1

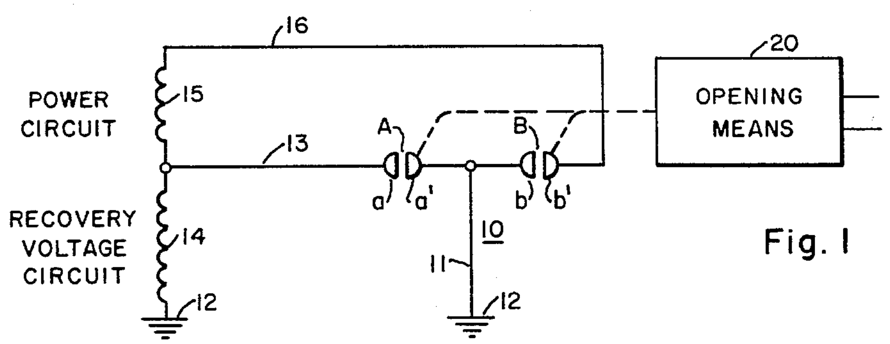

Fig. 1

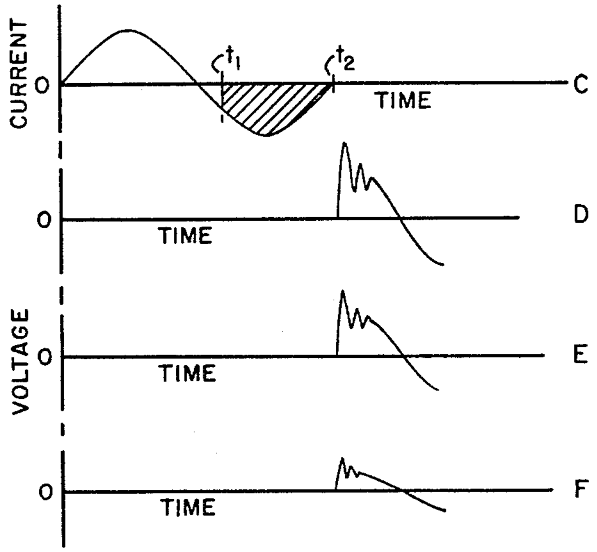

Fig. 2

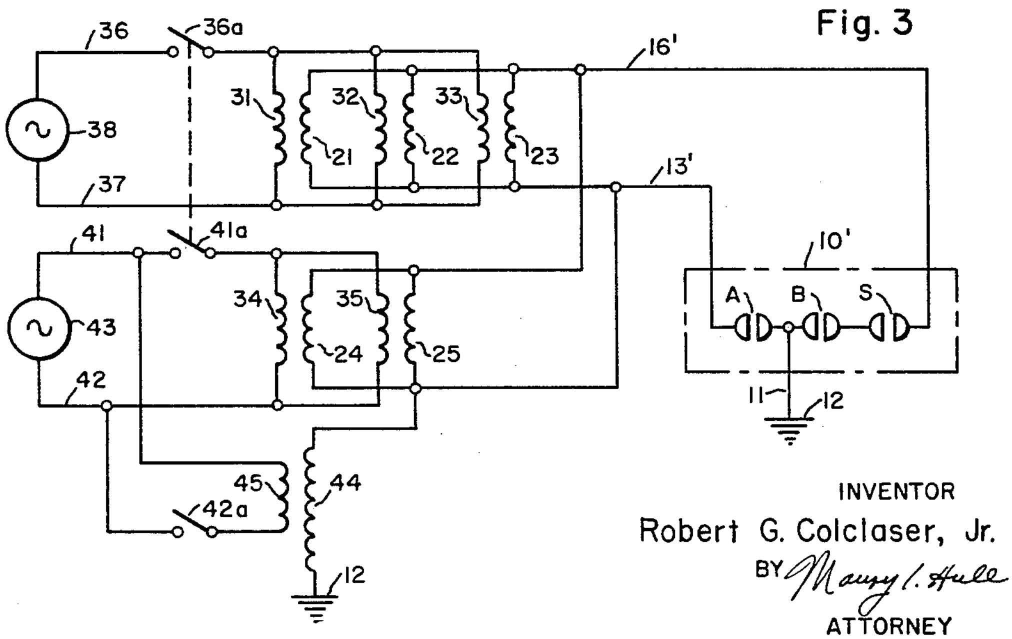

Fig. 3

INVENTOR
Robert G. Colclaser, Jr.
BY Maury I. Hull
ATTORNEY

CIRCUIT BREAKER TESTING CIRCUITS IN WHICH A NORMALLY CLOSED PAIR OF CONTACTS IN A HIGH CURRENT PATH SHORT CIRCUITS A HIGH RECOVERY VOLTAGE SOURCE AND ANOTHER PAIR OF NORMALLY CLOSED CONTACTS FORMS A LOW IMPEDANCE SHUNT CIRCUIT ACROSS THE HIGH VOLTAGE SOURCE UNTIL BOTH PAIRS OF CONTACTS ARE OPENED

Filed April 24, 1967 3 Sheets-Sheet 2

CIRCUIT BREAKER TESTING CIRCUITS IN WHICH A NORMALLY CLOSED PAIR OF CONTACTS IN A HIGH CURRENT PATH SHORT CIRCUITS A HIGH RECOVERY VOLTAGE SOURCE AND ANOTHER PAIR OF NORMALLY CLOSED CONTACTS FORMS A LOW IMPEDANCE SHUNT CIRCUIT ACROSS THE HIGH VOLTAGE SOURCE UNTIL BOTH PAIRS OF CONTACTS ARE OPENED

Filed April 24, 1967 3 Sheets-Sheet 3

United States Patent Office 3,398,357

Patented Aug. 20, 1968

3,398,357

CIRCUIT BREAKER TESTING CIRCUITS IN WHICH A NORMALLY CLOSED PAIR OF CONTACTS IN A HIGH CURRENT PATH SHORT CIRCUITS A HIGH RECOVERY VOLTAGE SOURCE AND ANOTHER PAIR OF NORMALLY CLOSED CONTACTS FORMS A LOW IMPEDANCE SHUNT CIRCUIT ACROSS THE HIGH VOLTAGE SOURCE UNTIL BOTH PAIRS OF CONTACTS ARE OPENED

Robert G. Colclaser, Jr., Delmont, Pa., assignor to Westinghouse Electric Corporation, Pittsburgh, Pa., a corporation of Pennsylvania Continuation-in-part of application Ser. No. 337,248, Jan. 13, 1964. This application Apr. 24, 1967, Ser. No. 649,755

3 Claims. (Cl. 324—28)

ABSTRACT OF THE DISCLOSURE

A breaker unit to be tested has at least one pair of normally closed separable contacts. An additional pair of normally closed separable contacts, which may be an additional pair of breaker contacts, or may be contact means provided for testing purposes, is connected in series with the first-named pair of contacts. A high current alternating current source is connected so that a large alternating current flows through both pairs of contacts while they are closed. A source of high alternating current voltage is connected across the breaker contacts, which while closed form a short circuit across the source of high alternating current voltage, and the additional contacts while closed form a low impedance shunt path by way of the high current source across the high voltage source. The phases of the two currents are such that they pass through zero current at substantially the same instant. Means is provided for opening both pairs of contacts together, and when the arc currents thereacross fall to zero, a high voltage simulating a recovery voltage is automatically developed across the breaker contacts without requiring critical timing circuits or any waveform measurements or current injection. A high voltage equal to the amplitude of the high voltage source plus or minus the no load amplitude of the voltage of the high current source is developed automatically across the other pair of contacts when the arc currents go to zero, depending upon the relative phase relationships of the voltages of the high current source and the high voltage source.

This application is a continuation-in-part of application Ser. No. 337,248 filed Jan. 13, 1964, and now abandoned.

*Field of the invention*

This invention relates to improvements in arrangements and circuits for testing circuit breakers, and more particularly to an improved synthetic test circuit utilizing separate current and voltage sources for testing a circuit breaker under conditions simulating the interruption of a large current flowing in a high voltage circuit.

Generally speaking, it is desirable to test a circuit breaker under conditions comparable to the most severe conditions which the breaker will encounter in actual use. Accordingly, it is desirable to test the ability of the circuit breaker to interrupt by the breaker contacts a current representing the maximum fault current which would be encountered in service, and also to test the circuit breaker under conditions where the dielectric strength of the breaker to ground following fault current interruption will be tested, and further under conditions where the breaker has a recovery voltage developed across the breaker contacts after the current through the opened contacts fails to zero.

Circuit breaker test laboratories have limited capacities because of economic considerations. For example, breakers are now generally in use which are rated at 500 kilovolts and 44,000 amperes. A direct laboraatory test cannot conveniently be made on such a breaker. Even where a breaker to be tested consists of a number of serially-connected interrupter units, and these are tested singly in an attempt to increase the apparent laboratory power, difficulty may be encountered in providing an adequate voltage and current source.

*Description of the prior art*

To overcome this difficulty synthetic test circuits have been devised in which the current is supplied from a low voltage source and the recovery voltage from a separate high potential source. The use of the so-called "bias" test circuit is well known, in which one transformer or several transformers comprise a high current source and a further transformer is used to bias one bushing to a high voltage above ground. This "bias" test circuit tests the dielectric strength of the breaker bushing to ground following fault current interruption. A number of prior art patents exist showing arrangements for doing this.

Among these are Patent No. 2,230,730 issued Feb. 4, 1941, to W. F. Skeats for "Circuit Breaker Testing Arrangement"; Patent No. 2,288,331 issued June 30, 1942, to W. F. Skeats for "Circuit Breaker Testing Appaartus"; Patent No. 2,898,548 issued Aug. 4, 1959, to E. Slamecka et al. for "Testing Apparatus"; and Patent No. 3,064,183 issued Nov. 13, 1962, to E. Slamecka for "Circuit-Breaker Testing Arrangements." But all prior art arrangements encounter some difficulties inherent with this type of testing equipment. Some of these difficulties are the timing of the application of the recovery voltage, the special switching and wave-shaping equipment required, and measuring or ascertaining the wave shape of the applied voltage and/or current.

*Summary of the invention*

My invention overcomes these and other difficulties and disadvantages of the prior art. I have discovered that in the testing of a breaker having at least two interrupter units each consisting of a pair of separable contacts which move with respect to each other to open the circuit through the pairs of contacts, the two sets of contacts opening at substantially the same instant, by connecting the two pairs of breaker contacts in series, by then connecting a high current source across the series-connected pairs of contacts and connecting a high bias voltage source across one pair of contacts, that the bias voltage supplied for example by a high voltage transformer will develop a simulated recovery voltage across the one interrupter unit, or across the one pair of contacts, when both pairs of contacts are opened and the arc currents through both pairs of contacts fall to zero and the arcs are extinguished. At the same instant that the pair of closed contacts forming a direct short circuit across the high voltage source is opened, the other pair of closed contacts forming a low-impedance shunt path across the high voltage source by way of the high current source is opened, allowing the full voltage of the high voltage source to be developed across one pair of contacts when the arc currents through the contacts are extinguished; at the same time, a high voltage which may be equal to that of the high voltage source plus or minus the no load voltage of the high current source is developed across the other pair of contacts depending upon the relative phase relationships of the two sources.

Furthermore, my circuit arrangement is self-timing in that the recovery voltage is developed automatically at substantially the instant when the arc currents through the breaker contacts fall to zero. My circuit arrangement permits duty cycle tests if desired.

Where a breaker to be tested has only one pair of contacts, or where the breaker to be tested is mounted on a pole, an auxiliary breaker may be connected in series therewith to complete the testing circuit arrangement.

Accordingly, a primary object of my invention is to provide a new and improved circuit for testing circuit breakers.

Another object is to provide a new and improved circuit breaker testing arrangement in which a high current is supplied from one source and a high recovery voltage is supplied from another source.

A further object is to provide a new and improved circuit breaker testing arrangement employing different sources for the current and recovery voltage, and in which the timing of the development of the recovery voltage takes place automatically and is inherent in the circuit design.

Still a further object is to provide a circuit breaker testing arrangement which permits the testing of "live tank" breakers.

An additional object is to provide a circuit breaker testing arrangement in which high frequency transients in a circuit may be simulated.

Yet another object is to provide a new and improved circuit breaker testing arrangement in which second half cycle fault currents may be simulated.

These and other objects will become more clearly apparent after a study of the following specification, when read in connection with the accompanying drawings.

*Brief description of the drawings*

FIGURE 1 is a basic circuit arrangement for testing a circuit breaker according to my invention;

FIG. 2 is a series of graphs illustrating the operation of the circuit or arrangement of FIG. 1;

FIG. 3 is a substantially complete schematic electrical circuit diagram for supplying the necessary currents and voltages of FIG. 1;

*Description of the preferred embodiments*

Figure 4:
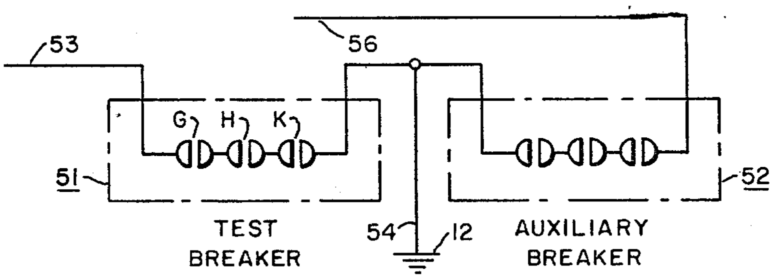
FIG. 4 is a partial schematic electrical circuit diagram showing how, by using an auxiliary breaker, a breaker may be given a "full pole" test.

Referring now to the drawings, in which like reference numerals are used throughout to designate like parts for a more detailed understanding of the invention, and in particular to FIG. 1 thereof, there are shown two units or two pairs of contacts designated A and B of circuit breaker generally designated 10. The term "unit" or "interrupter unit" may be employed hereinafter to designate a pair of separable contacts. Unit A has separable contacts *a* and *a'*, while unit B has separable contacts *b* and *b'*. Contact opening means 20 is provided, which may be a solenoid if desired. Lead 11 connects the contacts *a'* and *b* together and is also connected to ground 12. The other contact *a* of the pair of contacts A is connected by way of lead 13 and winding 14 to ground 12. Winding 14 is the secondary of a high voltage step-up transformer, and has developed thereacross a voltage of, for example, 132 kilovolts. Winding 14 and lead 13 are also connected to one terminal of a secondary 15; secondary 15 has the other terminal thereof connected by way of lead 16 to contact *b'* of the unit B. Secondary 15 is a high current source, and it is understood that the primaries of the transformers having secondaries 14 and 15 may be supplied from the same on separate alternating current sources. Secondaries 14 and 15 are connected in phase opposition so that if, for example the secondary 15 develops a voltage of 22 kilovolts, then the voltage across unit A will be 132 kilovolts, the voltage across unit B will be 110 kilovolts, and the voltage across the two series-connected units A and B will be 22 kilovolts.

It will be apparent from an inspection of the circuit of FIG. 1 that contacts A while closed form a direct short circuit across the high voltage source 14; source 14 is chosen to have sufficient internal impedance not to be damaged by being short-circuited for a brief interval of time. It is further apparent from an inspection of the circuit of FIG. 1 that contacts B while closed form a low-impedance shunt path across high voltage source 14 by way of high current source 15.

Furthermore, while contacts A and B are closed, current from source 14 is flowing through contacts A, and current from source 15 is flowing through both contacts A and B. The current waveforms of the two currents must be such that they pass through current zero at substantially the same instant to insure that arc currents at A and B after the contacts are opened are extinguished at the same instant, to permit the development of the high voltage simulating a recovery voltage.

One way of accomplishing this is to have alternating current sources 14 and 15 of the same frequency. They may be transformer secondaries having primaries energized from the same alternating current generator, as shown in FIG. 3. It will be noted that the circuits of both sources 14 and 15, FIG. 1, are primarily inductive, wherein the currents will lag the voltages. That the voltage waveforms may not be in phase because the inductance values of the high current source and the high voltage source will be different is relatively unimportant, so long as the currents from the two sources pass through current zero at substantially the same instant.

Another way to obtain currents having the desired time relationship is to have the frequencies of sources 14 and 15 harmonically related.

Another, more difficult way is to provide sources of different frequencies, with means, not shown, for ascertaining the relative timing of both the current wavefoms, and with means, not shown, for advancing or retarding the current waveform of one source to insure that it goes through current zero at substantially the same instant that the other current waveform goes through current zero.

Particular reference is made now to FIG. 2 where curves C, D, E and F drawn to substantially the same time scale represent respectively the current through the unit A which is the sum of the current from source 15 and that from source 14, the voltage across A, the voltage across B, and the voltage across A plus B. The graph F has the amplitude scale thereof exaggerated somewhat for clarity of illustration by comparison with the amplitude scales of curves D and E. The irregular waveforms of the voltages of curves D, E, and F result from the inductance and capacity inherent in the circuit and the oscillatory nature thereof.

In testing the circuit breaker 10, the contacts of units A and B are made to part simultaneously at a time $t_1$ indicated in curve C as occurring very shortly after the beginning of one alternation of the current in the circuit, in the example shown the negative alternation. Curve C represents the total current from both sources 14 and 15. The wave shape of the arc currents is shown somewhat idealized, but the arc between the contacts of unit A, as well as the arc between the contacts of unit B, is extinguished at substantially the instant when the current goes to zero, or at time $t_2$. When the current through contacts A and contacts B falls to zero and the arc thereacross is extinguished at time $t_2$ (it being assumed that the dielectric recovery strength is sufficient to prevent reignition), the voltage across unit A rises rapidly to its maximum value of, for example, 132 kilovolts simulating the recovery voltage following a fault current interruption by a circuit breaker; at the same instant $t_2$ the voltage across unit *b* rises rapidly to a value of, for example, 110 kilovolts, and the voltage across the series-connected unit A and B and source 15 rises rapidly to a value of, for example, substantially 22 kilovolts. The curves of D, E and F illustrate also the transient effects in the developed voltages resulting from the interruption of the current and the aforementioned oscillatory nature of the circuits resulting from inherent inductance and capacity.

It is to be noted however that the timing of the application or development of the recovery voltage is automatic and occurs at the moment when the arc currents through the contacts of unit A and B fall to zero.

As will be seen hereinafter, where a breaker has only a single interrupter unit, contacts B may be provided by contact means including a pair of normally closed separable contacts, connected to be opened simultaneously with the opening of the contacts of the breaker under test. The contact means may be an auxiliary breaker connected in series with the breaker to be tested.

Particular reference is made now to FIG. 3, which shows a complete circuit for deriving the voltages and currents needed for testing according to the basic circuit of FIG. 1. In FIG. 3, circuit breaker 10' is shown by way of illustration as having three units or sets of contacts A, B and S all connected in series, the junction between units A and B being connected by way of lead 11 to ground 12, one of the contacts A being connected to lead 13', one of the contacts S being connected to lead 16'. It is seen that the leads 13' and 16' are connected to several secondaries which are connected in parallel and in phase with each other, the secondaries being designated 21, 22, 23, 24 and 25, in order to supply sufficient current for the testing of the breaker contacts. The secondaries 21, 22, 23, 24 and 25 have associated therewith primaries 31, 32, 33, 34 and 35, respectively, some of the primaries, for example 31, 32 and 33 being connected by way of leads 37 and 36 and switch **36*a* to one source of energizing alternating current potential 38, other of the primaries, for example 34 and 35, being connected by way of leads 42 and 41 and switch 41*a* to an additional source of alternating current potential 43. It is seen that lead 13' is connected by way of a high voltage secondary 44 to ground 12, and that high voltage secondary 44 has an associated primary 45 connected across the aforementioned leads 41 and 42 by way of switch 42*a* to be energized from the alternating current source 43. For simplicity of illustration the cores of the various transformers are omitted, but it will be understood that the transformers have suitable cores in accordance with the frequency of the sources 38 and 43, which may be for example 60 cycles per second, to provide for the maximum transfer of energy between the primaries and the secondaries. In FIG. 3 the secondary 44 corresponds to the recovery voltage circuit winding 14 of FIG. 1, whereas the secondaries 21, 22, 23, 24 and 25 all connected in parallel and in phase with each other correspond to the high current source 15** shown in FIG. 1.

As seen from FIG. 3, switches **36*a* and 41*a* may be ganged to be closed at the same instant to energize the transformers which supply the high current to the test circuit, and switch 42*a* in series with the primary 45** of the high voltage transformer may be and preferably is separately controlled, so that the phases of the currents in the high current circuit and high voltage circuit may be separately controlled with respect to each other by adjusting the asymmetry in the respective circuits. This is desirable for reasons to be more fully stated hereinafter.

It will be further understood that the circuit breaker under test designated 10' in FIG. 3 may have any convenient number of pairs of contacts three being shown for convenience of illustration. Circuit breaker 10' also has means, not shown for convenience of illustration, such as a solenoid, for opening the contacts of the units A, B and S.

Particular reference is made now to FIG. 4, in which an arrangement is shown for utilizing an auxiliary breaker in conjunction with a circuit breaker to be tested, the breaker to be tested being designated 51 and having three pairs of contacts or units G, H and K connected in series. The auxiliary breaker 52 has a like number of sets of contacts, all connected in series with each other and in series with the units of the breaker to be tested. The junction between breakers 51 and 52 is connected by way of lead 54 to ground 12, the two breakers 51 and 52 being connected by leads 53 and 56, respectively, to a high current source, for example source 15 of FIG. 1, the leads 53 and 56 corresponding to the leads 13 and 16, respectively, of FIG. 1. Furthermore, lead 53 is connected by way of a high potential source 14 or 44, not shown in FIG. 4 for convenience of illustration, to supply a recovery voltage between ground 12 and the breaker contacts. The circuit of FIG. 4 is especially adapted for making a full pole test of a breaker, where it is undesirable to make any field changes in the connection of the various contacts. It is seen that by providing an auxiliary breaker to correspond to the contacts B of FIG. 1 that breaker 51 may be given a suitable test corresponding to the test described in connection with FIG. 1. It will be understood that the breaker 51 under test and the auxiliary breaker 52 have their contacts opened at substantially the same instant, suitable contact opening means, for example a solenoid in each of the breakers 51 and 52, being provided for this purpose, the solenoids not being shown in FIG. 4 for convenience of illustration.

Figure 5:
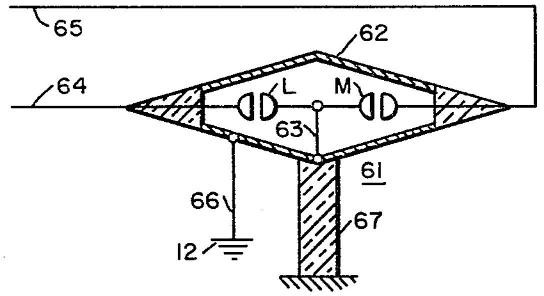
FIG. 5 is a partial schematic circuit diagram showing how a "live tank" breaker may be tested in accordance with the principles of my invention.

Particular reference is made now to FIG. 5, in which the breaker generally designated 61 is enclosed in a so-called "live" tank 62; in accordance with the usual practice the center connection betwen two series-connected pairs of contacts L and M is connected by lead 63 to the tank 62 which is composed of conductive material, the two leads from the breaker being designated 64 and 65. The circuit breaker 61 is easily adapted for testing with the test circuit of FIG. 1 or FIG. 3 by grounding the tank 62 through the lead 66 to ground 12. Leads 64 and 65 are then connected across a high current source which may correspond to source 15 of FIG. 1, and lead 64 is further connected by way of a high potential recovery voltage source to ground 12, the high potential recovery voltage source corresponding to source 14 of FIG. 1. It is seen in FIG. 5 that the live tank 62 is supported by insulating means 67. Contact opening means, such as a solenoid, not shown, is provided for the contacts L and M of breaker 62.

Figure 6A:
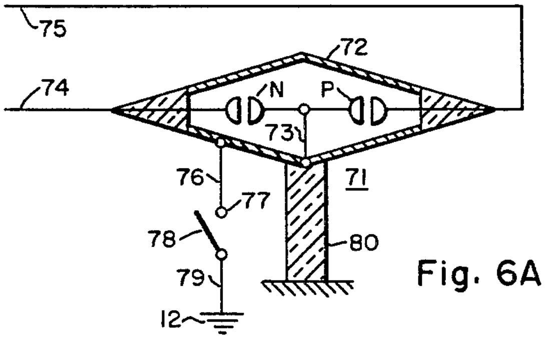
FIG. 6A is a partial schematic circuit diagram showing a circuit in which the ground lead is connected to the breaker after the current zero has passed to produce second half cycle fault current.

Particular reference is made now to FIG. 6A, in which a testing arrangement is shown for producing second half cycle fault current by connecting the ground lead to the breaker after the current zero has passed. In FIG. 6A a breaker under test is generally designated 71, having a tank 72, having series connected contact units N and P, the junction therebetween being connected by lead 73 to the tank 72 of conductive material. Contacts N and P are connected respectively by leads 74 and 75 across a high current source corresponding to source 15 of FIG. 1, and lead 74 is additionally connected across a high voltage source to supply a recovery voltage corresponding to the high voltage source 14 of FIG. 1, the other end of the high voltage source, not shown for convenience of illustration, being connected to ground 12. The tank 72 is supported by suitable insulating means 80, FIG. 6A. Lead 76 is connected to the tank 72 and is connected to one terminal 77 of a grounding circuit breaker or switch, the control means for which is not shown for convenience of illustration, the other contact of the breaker or switch being designated 78 and being connected by way of lead 79 to ground 12. It will be understood that suitable means, not shown, is provided for closing the contacts 77–78 at a desired instant corresponding to a desired moment in the cycle of the alternating current flowing through the circuit breaker 71. Suitable means, not shown for convenience of illustration, such as a solenoid, is provided for opening contacts N and P at a desired instant.

Figure 6B:
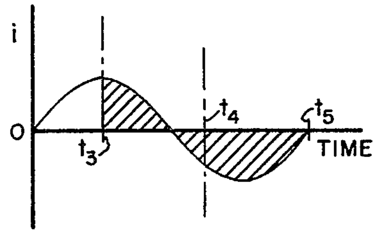
FIG. 6B is a graph illustrating the operation of the circuit of FIG. 6A.

Particular reference is made to FIG. 6B, where the current through the breaker 71 is plotted as a function of time. The breaker contacts N and P are opened at a time $t_3$ corresponding, for example, to the crest of a positive alternation of the current in leads 74 and 75; when the current next goes through zero, sufficient voltage exists to maintain or reignite the arc across the contacts. At a time shortly after the current first goes through zero and corresponding to the time $t_4$ of the graph of FIG. 6B, the contacts 77 and 78 are closed, grounding the tank 72 and grounding lead 73, causing in effect a circuit corresponding to the circuit of FIG. 1 to exist. The current through the contacts N and P falls in a manner illustrated by the graph of FIG. 6B, and at a time $t_5$ the current reaches zero, at which time $t_5$ the recovery voltage from the high voltage source 14, not shown for convenience of illustration, is developed across the breaker under test.

Figure 7A:
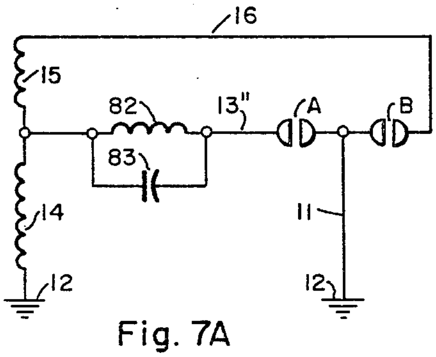
FIG. 7A is a circuit for causing the production of high frequency transients.
Figure 7B:
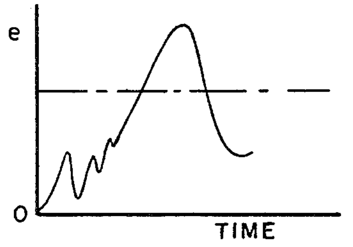
FIG. 7B is a graph illustrating the operation of the circuit of FIG. 7A.

Particular reference is made now to FIG. 7A, which is similar to FIG. 1 except that a parallel L-C circuit including the inductor 82 and the capacitor 83 is connected in series with a lead 13″ connecting the pair of contacts A to the junction between the current source 15 and voltage source 14. The L-C circuit comprising 82–83 introduces a high frequency transient, and results in the production of a multiple frequency recovery voltage such as that shown in FIG. 7B where the voltage is plotted as a function of time, the curve or graph of FIG. 7B illustrating the recovery voltage across terminals A, FIG. 7A. Suitable means, such as a solenoid, not shown, is provided for opening contacts A and B, FIG. 7A.

Figure 8A:
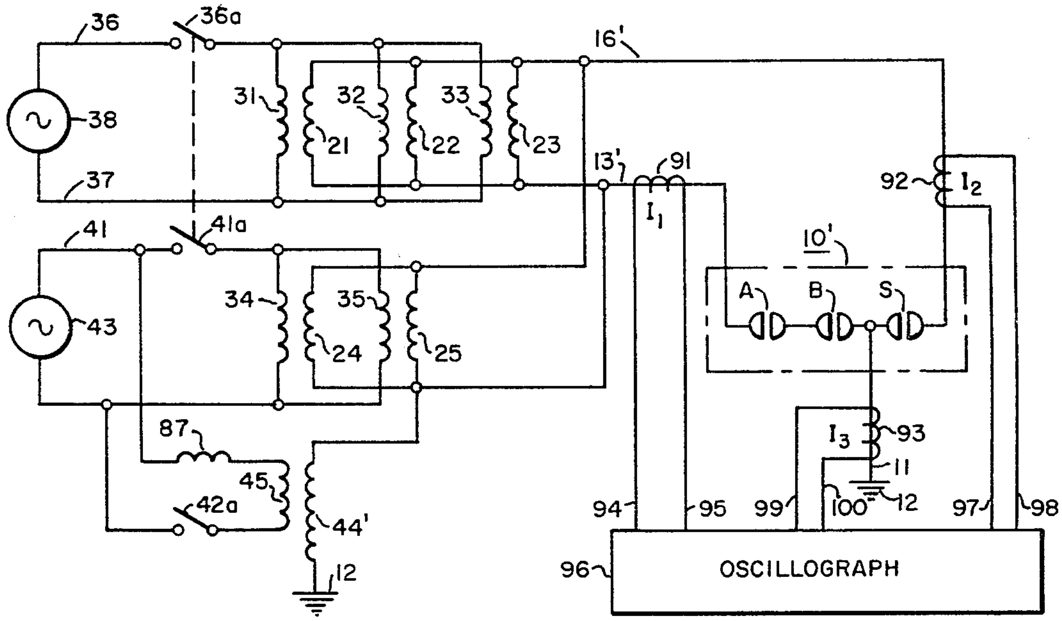
FIG. 8A is a complete electrical circuit diagram of a circuit breaker under test showing connections to a recording oscillograph for registering currents and voltages at various points in the circuit.

Particular reference is made now to FIG. 8A, which is similar to FIG. 3, except that secondary 44′ is connected with its voltage in phase adding with the voltage of the high current secondaries, and ground lead 11 is connected between interrupter units B and S so that the highest recovery voltage is developed across unit S. FIG. 8A shows in addition means for ascertaining and recording the currents at various points in the circuit. In series with the primary 45, FIG. 8A, there is a small choke or inductor 87, which may be provided in order merely to limit the fault current in the transformer comprising primary 45 and high voltage secondary 44. The inductive reactance 87 may be omitted if it is not needed,. It is seen that three pickup coils 91, 92 and 93, which may be reponsive to changes in the strength of the magnetic field of the adjacent lead wire as the value of the current flowing therein changes, are operatively associated respectively with leads 13′, 16′ and 11 in FIG. 8A, the pickup coil 91 being connected by leads 94 and 95 to a recording oscillograph 96, pickup coil 92 being connected by leads 97 and 98 to the oscillograph, and pickup coil 93 being connected by leads 99 and 100 to the oscillograph 96, which may be of any convenient design. It will be understood that the pickup coils 91, 92 and 93 are insulated as required by the circuit voltages from the aforementioned respective leads.

Figure 8B:
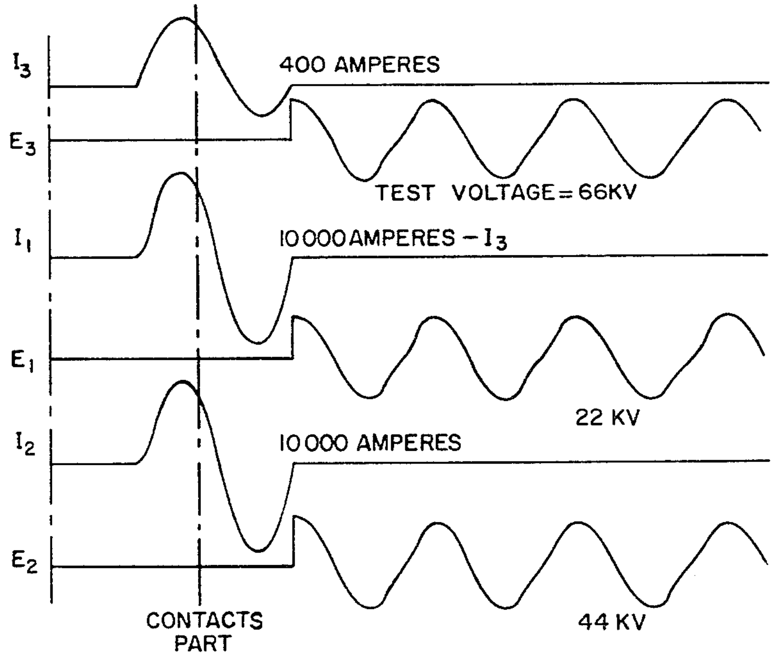
FIG. 8B is a series of graphs illustrating the operation of the apparatus in the circuit of FIG. 8A.

Particular reference is made now to FIG. 8B, containing graphs to facilitate a comparison of the voltages and currents under selected test conditions, where the curves, $I_1$, $I_2$ and $I_3$ correspond to the currents at various points in the circuit of FIG. 8A, but it should be noted that the curves of FIG. 8B represent test results at 66 kilovolts, 44 kilovolts and 22 kilovolts. In accordance with the description given hereinbefore of the operation of the apparatus, current $I_3$ is seen to be relatively small and may be for example 400 amperes, representing the current supplied by the secondary 44′. Current $I_1$ is the current through the breaker contacts A and may be for example 10,000 amperes, minus the current $I_3$. Current $I_2$, the current through units or contacts B and S, is 10,000 amperes. Underneath the current curves, the test voltage curves illustrate the recovery voltages developed at various points in the circuit when the current through the contacts A, B and S falls to zero. Voltages $E_2$, $E_1$ and $E_3$ correspond to the respective voltages from lead 13′ to ground, from lead 13′ to lead 16′, and from lead 16′ to ground. These are, in the illustrated test, 44 kilovolts, 22 kilovolts, and 66 kilovolts. Any suitable voltage pickup means, not shown for convenience of illustration, may connect the oscillograph to the test circuit. The curves of FIG. 8B, which are substantial reproductions of actual test oscillograms, clearly show the transient high frequency effects active in the circuit. The test results shown in FIG. 8B were made on a two unit breaker utilizing sulfur hexafluoride as an insulating and interrupting medium for the breaker.

Critical timing in the circuit of FIG. 8A requires that currents $I_2$ and $I_3$ go through zero together. Since $I_1$ is the difference of these currents, it too will go through zero. If the current zeros do not occur simultaneously, a delay in the application of the high voltage to the test break unit S occurs, making the test less valuable. Arc voltage, for example, will tend to force the currents to zero, having a more pronounced effect on the low voltage current, so that, unless separate timing is provided, a delay which might be short or might extend to one half cycle would normally occur. By using separate closing devices such as aforementioned switches 36a, 41a, and 42a, the amount of asymmetry can be varied, shifting current zeros until they coincide. It is this feature of the circuit which makes the tests more valuable.

In utilizing the test circuits of FIG. 3 and FIG. 8A, preferably the contacts of units A, B and S are opened approximately one cycle after switches 36a, 41a and 42a are closed energizing the transformers. As previously stated, a very small time interval may separate the energizing of the high current transformer sources and the high voltage transformer source, so that under certain test conditions a one cycle time delay before opening the breaker contacts can only be approximated with respect to at least one of the voltages applied to the test circuit. A delay beyond one cycle might result in loss of control of the asymmetries provided for by the separate switches.

While it is preferable that contacts A and B (and S) open at the same instant, a slight difference in the time the various contacts open will not prevent the currents from going through zero at the same time. Preferably the time difference between the opening of contacts A and B and the opening of contacts S should never exceed one quarter of a cycle, FIG. 8A.

Figure 9:
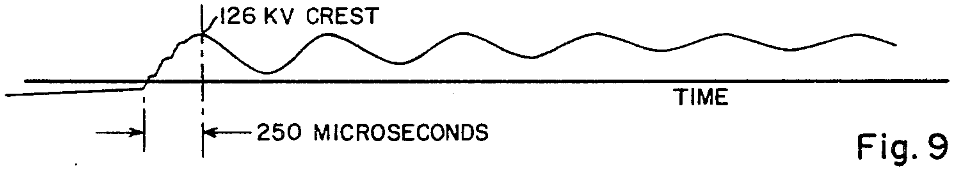
FIG. 9 is a graph showing the voltage across a breaker under test under another set of test conditions.

Particular reference is made now to FIG. 9, which shows a high speed cathode ray oscillogram on a greatly expanded time scale of a recovery voltage which attains a maximum of 126 kilovolts crest in a time period of approximately 250 microseconds. The test current involved in the breaker test of FIG. 9 was of the order of 37,500 amperes.

It will be understood that the oscillograph apparatus of FIG. 8A may be used with the circuits of FIGS. 3, 4, 5, 6A and 7A.

The switches used to separately control the current and voltage sources in FIGS. 3 and 8A may be used in all other embodiments of the invention.

Whereas I have described FIG. 1 with respect to a breaker having multiple contact units which open at substantially the same instant, it should be understood that contacs B could open a predetermined short time after or before contacts A, if desired.

There have been provided then, circuit breaker testing arrangements of outstanding simplicity in which recovery voltage timing is accomplished automatically by the extinction of the fault current. Single break or full pole tests can be made with equal facility. Duty cycle tests of any nature can be performed with ease. Unequal gas flow is not a problem since arcing is present in all of the breaks.

The aforedescribed drawings and the aforegoing written description are illustrative and exemplary only and are not to be interpreted in a limiting sense.

I claim as my invention:

1. Apparatus for testing a circuit breaker having at least one pair of normally closed separable contacts comprising, in combination, contact means including another pair of normally closed separable contacts, one contact of the circuit breaker and one contact of the contact means being connected together, alternating current source means connected to the breaker and contact means for causing a large alternating current of predetermined frequency to flow through the contacts of the breaker and those of the contact means while both the pairs of contacts are closed, other alternating current source means of the same frequency connected across the pair of contacts of the breaker for applying a high alternating current voltage across said last-named pair of contacts, said last-named pair of contacts while closed substantially short-circuiting the other alternating current source means and the pair of contacts of the contact means while closed connecting said alternating current source means in shunt with the other alternating current source means providing a low-impedance path thereacross, whereby no high voltage is developed across the contacts of either pair from the other alternating current source means, means including switch means controlling the large alternating current source and other switch means controlling the source of high alternating current voltage for introducing controlled asymmetries in the respective circuits whereby phases of the currents in the source means and the other source means are so related to each other that the current through both pairs of contacts from the source means and the current through the breaker contacts from the other source means pass through current zero at substantially the same instant, means for opening both pairs of contacts simultaneously at a selected moment, the contacts of both pairs of contacts being moved apart a sufficient distance when opened whereby the dielectric recovery strength of the gaps between contacts is sufficient to extinguish the arcs between contacts at the next current zero and prevent reignition of the arcs and the arc currents between both pairs of contacts fall to zero, the opening of the pair of contacts of the breaker removing the short-circuit across the other alternating current source means, the opening of the pair of contacts of the contact means removing the low-impedance path across the other alternating current source means, said high voltage from said other alternating current source means being automatically developed across the contacts of the circuit breaker at the instant of the cessation of arc current flow through both said pairs of contacts, said last-named high voltage corresponding to a recovery voltage.

2. Apparatus for testing a circuit breaker unit having at least one pair of normally closed separable contacts comprising in combination, contact means forming an additional pair of normally closed separable contacts, lead means connecting one contact of the breaker unit and one contact of the contact means together, a source of alternating current of preselected frequency having one terminal thereof connected to the other contact of the breaker unit and the other terminal thereof connected to the other contact of the contact means, first switching means for said source for controlling the time of application of the alternating current across the contacts of the series-connected breaker unit and those of the contact means, an additional alternating current source of high voltage of the same frequency as the first named source connected between the lead means and the other contact of the breaker unit, second switching means for the additional alternating current source for controlling the application of voltage from the additional alternating current source to the circuit breaker unit and to the contact means, said first switching means and said second switching means being closed at preselected times with respect to each other whereby an adjusted asymmetry is introduced and the current zeros of the source and the additional source occur simultaneously, both the first and second switching means being initially closed while both the contacts of the breaker unit and those of the contact means are closed thereby connecting both of the sources of alternating current to the contact means and the breaker unit, the contacts of the breaker unit while closed short-circuiting the additional alternating current source whereby no voltage from the additional source is developed across the contacts of the breaker unit while said last-named contacts are closed, the contacts of the contact means while closed connecting said source of alternating current in shunt with the additional alternating current source and providing a low-impedance path thereacross, and means for opening the contacts of the breaker unit and those of the contact means at the same preselected moment, the opening of both pairs of contacts being followed by a period during which the arc between contacts of the circuit breaker unit is extinguished together with the arc between contacts of the contact means and the arc current through the contacts of the breaker unit and the arc current through the contacts of the contact means fall to zero and the arcs are not reignited, a high alternating current voltage being developed across the contacts of the breaker unit as a result of the removal of said short-circuit and said low-impedance path at substantially the instant when the arc currents through both said pairs of contacts are extinguished, the high alternating current voltage simulating a recovery voltage, at least a portion of the high alternating current voltage being developed across the contacts of the contact means.

3. Apparatus according to claim 2 wherein the source of alternating current of preselected frequency is additionally characterized as including a plurality of transformers each having a primary and a secondary, all of the secondaries being connected in parallel, a first alternating current generator, said first switching means including at least a double-pole single-throw switch, one of the poles of the first switching means connecting the first alternating current generator to some of the primaries, a second alternating current generator of the same frequency, the other pole of the first switching means connecting the second alternating current generator to the other primaries, and wherein the source of high alternating current voltage includes an additional transformer having a high voltage secondary and a primary, and second switching means operatively connecting said last-named primary to the second alternating current generator.

References Cited

UNITED STATES PATENTS 2,088,445 7/1937 Skeats -------------- 324—28

RUDOLPH V. ROLINEC, *Primary Examiner.*

E. L. STOLARUN, *Assistant Examiner.*